United States Patent [19]

Castagna

[11] 3,800,562

[45] Apr. 2, 1974

[54] BRAKE SYSTEM FOR BATTERY OPERATED RECORDER

[75] Inventor: John Frank Castagna, Brooklyn, N.Y.

[73] Assignee: Optasound Corporation, New York, N.Y.

[22] Filed: July 27, 1972

[21] Appl. No.: 275,737

Related U.S. Application Data

[62] Division of Ser. No. 181,313, Sept. 17, 1971, abandoned.

[52] U.S. Cl. .................................. 188/161, 352/17

[51] Int. Cl. ........................ F16d 67/00, G03b 31/00

[58] Field of Search ........... 188/156, 158, 161, 163, 188/164; 352/15, 17, 19

[56] References Cited

UNITED STATES PATENTS

| | | | |
|---|---|---|---|
| 3,516,526 | 6/1970 | Seesselberg | 188/158 X |
| 3,558,997 | 1/1971 | Dere | 188/161 UX |

*Primary Examiner*—Duane A. Reger
*Attorney, Agent, or Firm*—Ryder, McAuley, Fields, Fisher & Goldstein

[57] ABSTRACT

A brake system is disclosed for use with a battery operated recorder, namely a tape recorder. The brake system is able to immediately terminate movement of the tape upon release of a control switch. The brake system is particularly useful in a system for synchronizing the recording of visual images on film and sound on tape.

13 Claims, 8 Drawing Figures

BRAKE SYSTEM FOR BATTERY OPERATED RECORDER

BACKGROUND

This is a division, of application Ser. No. 181,313, filed Sept. 17, 1971, now abandoned.

This invention relates to brake systems and, more particularly, to such a brake system for use with apparatus for synchronizing the recording of sound on tape with the simultaneous recording of pictures taken by a motion picture camera.

There is substantial interest and need for relatively inexpensive equipment for making sound motion pictures. It is desirable to provide a system which enables the use of conventional motion picture cameras for recording visual images and the use of conventional tape recorders for recording sound simultaneously with the recording of the visual images. For desirable results it is essential that the recording of both are synchronized in a manner which ensures a synchronized playback and which permits accurate editing of the sound and visual images.

In order to avoid purchasing expensive special cameras equipped to be used with sound recorders, one traditional approach used by amateur movie makers has been to record the sound on tape during the taking of motion pictures by attempting to synchronize the movement of the tape past the recording head with the movement of the film past a camera lens. This method is inaccurate and unsatisfactory, especially where there are frequent stops and starts during the recording process.

Many attempts have been made to overcome these problems. In one such attempt an independently driven camera and tape recorder are related through circuitry which utilizes a pulsating signal recorded on the sound tape which is intended to correspond to the frames of the motion picture film. This has not proved adequate because the synchronization depends upon the proper governing of the speed of the tape recorder and motion picture camera since each element runs independently and neither is wholly dependent during operation on the other. Another system controls the camera motor speed as a function of the tape speed. This requires a special camera and tape recorder. Furthermore, such equipment requires complex editing equipment to properly edit the film and sound tape, the editing equipment having to compare the recorded pulses with the corresponding frames. Because the comparison depends upon recorded signals the tape and film cannot be visually compared and matched. Also these systems have a tendency to slip which results in loss of lip synchronization (sound compared with lip movement). These and other techniques are considered ineffective and often too expensive to satisfy much of the amateur movie making market, including the home motion picture field.

Copending U.S. Pat. application Ser. Nos. 76,437 filed Sept. 29, 1970 entitled Tape and Film Synchronizing Apparatus and S. N. 79,829 filed Oct. 12, 1970 entitled Tape and Film Synchronizing System disclose apparatus and a system which overcomes many of the disadvantages of the prior art systems. As disclosed therein the system includes a movie camera and tape recorder each of which is capable of independent operation. When used individually, the camera is actuated by closing a switch which closes a circuit enabling a battery to energize a motor which in turn drives the film and operates the camera shutter. When the recorder and camera are interconnected the camera trigger switch is disconnected from the camera motor circuit and is connected to the tape recorder so that when the camera switch is closed, instead of the camera motor being energized, the tape recorder motor is energized causing the magnetic recording tape to move past the sound recording head. Means for observing the movement of the tape, such as optical means reading perforations along the edge of the tape, operates an electronic switch which effects completion of the movie camera motor circuit resulting in pulsating actuation of the camera. After each motion picture film frame is exposed the camera circuit is opened and remains open until a subsequent portion of the sound recording tape advances which then recloses the movie camera control circuit and reenergizes the movie camera to expose the next successive frame.

By means of this system the camera is directly controlled by the tape recorder whereby each exposed motion picture frame corresponds to a particular segment of the sound tape. Furthermore, there is no chance that the film will be exposed without the tape recorder operating. Conventional battery operated cameras, with minor and inexpensive modifications, can be used with this system.

Since the camera "turn-on" signal from the tape recorder is generated by an optical system in combination with perforations through the tape, there is provided a means for visually and mechanically linking the sound tape with the movie film, namely the perforations on the sound tape corresponding to the perforations on the movie film. This simplifies editing of the two recordings and avoids slippage during playback, both of which ensures that lip synchronization is maintained.

The system of the invention disclosed in copending U.S. Pat. application Ser. No. 275,920 is an improvement over the system disclosed in the above-referred to copending applications. In addition to improvements in the circuitry employed to obtain the advantages described above, this system provides greater flexibility of use and eliminates certain potential problem areas as described below by isolating the tape recorder circuit from the camera circuit while preserving the slave relationship of the camera to the tape recorder. This improved system also provides for the length of sound recording tape to equal the length of movie film so that a visual and physical match-up of the two recording mediums can be made to simplify editing the film and tape. The invention disclosed herein provides a positive mechanical brake to immediately stop the movement of the sound recording tape when the system actuating switch is opened thus preventing the sound recording tape from advancing due to inertia of the tape recorder fly wheel which drives the tape advancing capstan thereby eliminating one other common flaw in other systems. In addition to being quick acting and effective, the brake of this invention consumes energy only for a very short time period.

OBJECTIVES

Accordingly, it is one objective of this invention to provide an improved brake system for use with a battery operated recorder which is able to instantly stop movement of the recorder system.

Another objective of this invention is to provide an improved brake mechanism for instantly stopping magnetic tape in a tape recorder upon opening an actuating switch and, furthermore, to provide a brake which consumes a minimum of energy.

A further object of this invention is to provide a brake system suitable for use in a system for synchronizing simultaneous recording of visual images and sound on two different mediums, namely film and tape.

DESCRIPTION OF THE DRAWINGS

These and other objectives and advantages will be readily apparent from the detailed description below taken together with the drawings in which.

BRIEF DESCRIPTION

Briefly described, this invention in one form comprises a brake system for use with a battery operated tape recorder such as a cassett type magnetic tape recorder having an idler wheel and a motor driven capstan for transporting the magnetic tape past a recording head. A brake is provided which physically grabs a pulley belt or flywheel which is used to drive the tape drive capstan. One form of brake mechanism comprises an electromagnet which attracts a leaf spring normally biased toward a position away from the belt, the belt passing between the leaf spring and a belt guide member. When the electromagnet is energized the leaf spring is forced to bear against the belt and belt guide member instantly stopping movement of the belt and, therefore, the drive capstan and magnetic tape. The electromagnet is actuated through a stop circuit which includes a normally off-biased transistor, a resistive member, and a charge storage member such as a capacitor. While the tape recorder is on, the transistor is biased off. As soon as the recorder circuit is opened, current flows through the resistive member charging the capacitor. During the initial period of capacitor charging, the voltage drops across the resistive member biases the transistor on and the transistor remains on until the voltage drop falls below the required level. While the transistor is on or closed, the tape recorder battery energizes the electromagnet which actuates the brake until the transistor turns off. This period of time is sufficient to terminate movement of the magnetic tape. If the recorder is turned on immediately after it is turned off, the resistive member and capacitor are shorted biasing the magnet control transistor off thereby inactivating the magnet and the leaf spring releases the belt permitting the tape recorder to operate.

DETAILED DESCRIPTION

CAMERA AND TAPE RECORDER

Figure 1:
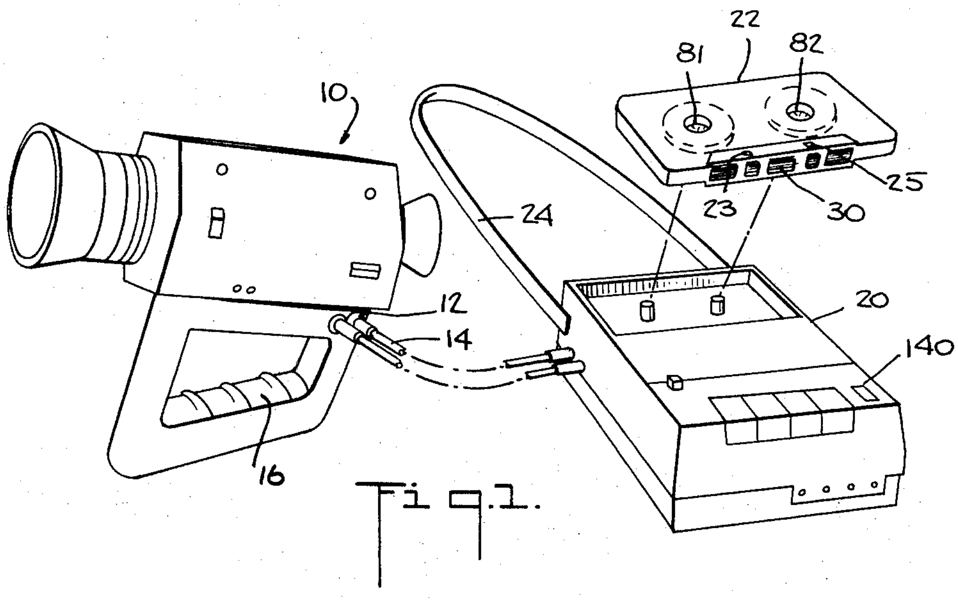
FIG. 1 is a perspective illustration of a motion picture camera and a cassette type tape recorder employing the synchronization system of this invention.

With reference to the drawings, and particularly FIG. 1, there is illustrated apparatus for recording simultaneously visual images and sound. Conventional electrically powered motion picture cameras 10 can be easily and inexpensively modified to permit them to be used with the system of this invention. The modification includes the addition of one or two small terminals 12 adapted to receive recorder cables 14 for purposes which are described below.

The battery operated camera 10 normally includes an on-off switch in the form of a trigger 16 such that when the trigger is depressed a switch is closed directly connecting a battery to the camera motor which in turn advances the film past a shutter in pulsating movements so that as each successive frame is presented to the shutter its motion is stopped while the shutter is opened exposing the film frame to the subject being photographed. After the shutter is closed the next frame is advanced into place. The camera operating mechanism is commercially available and does not form a part of this invention.

In order to record sound simultaneously with the recording of the visual images there is provided a magnetic tape recorder 20. For illustrative purposes, a cassette type recorder is illustrated and will be discussed throughout this specification. The magnetic tape is stored within a cassette 22 which is a sealed plastic housing containing two reels with a magnetic tape permanently attached to its ends to the reels. The cassette may be instantly and easily loaded into or removed from the tape recorder 20. The recorder is electrically connected to the camera 10 by two cables 14 which can be easily disconnected to allow the camera and recorder to be used individually. The recorder is light and adapted to be carried by means of a shoulder strap 24. The magnetic tape recorder 20 may be a standard battery operated recorder modified to include the synchronization system of this invention.

Figures 2, 5:
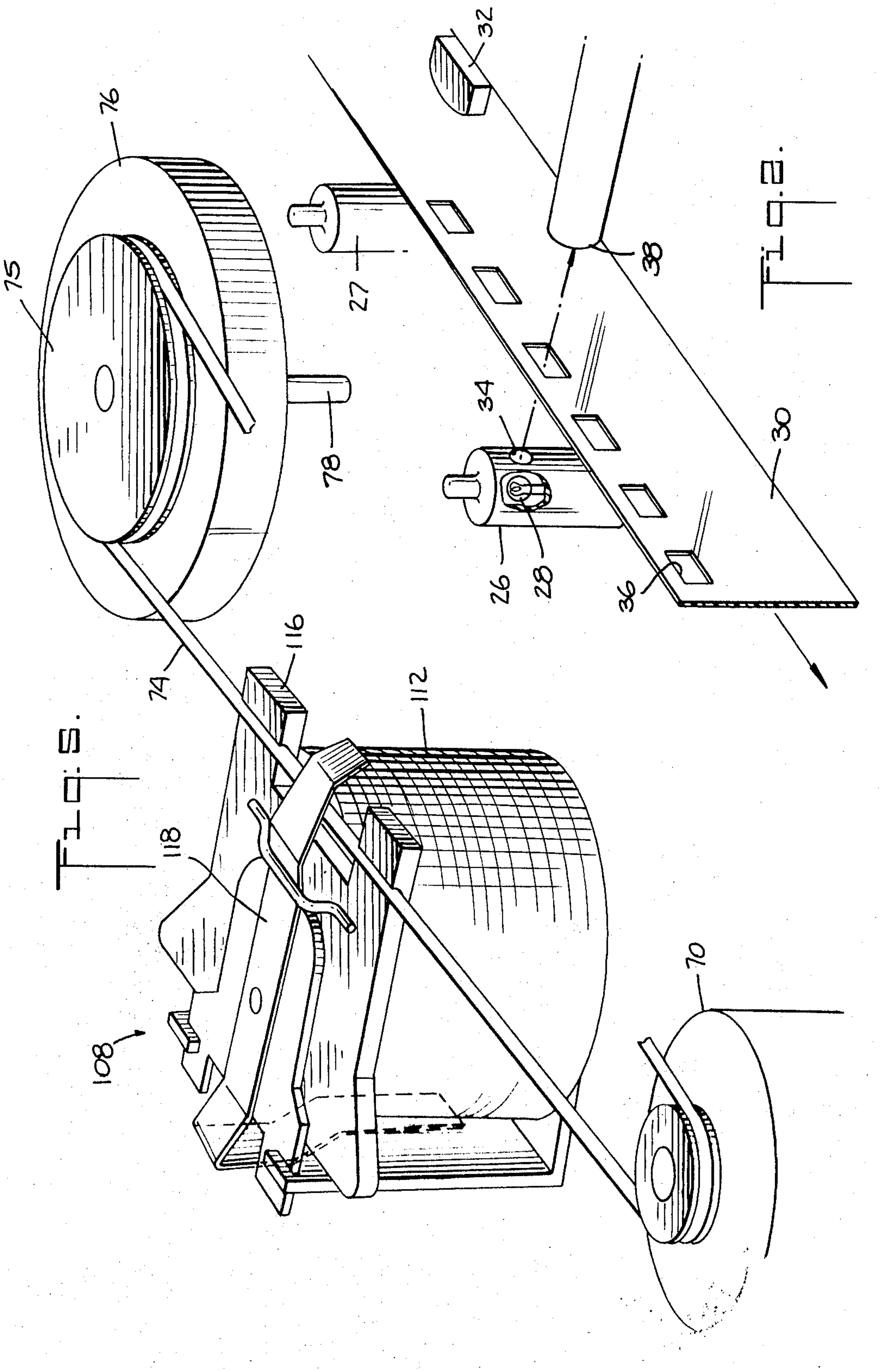
FIG. 2 is an enlarged perspective view of a portion of a tape recorder illustrating the magnetic tape and optical system utilized in the synchronization system of this invention.
FIG. 5 is an enlarged perspective view of the magnetic tape brake of FIG. 4.

As is described in copending U.S. Pat. application Ser. No. 76,437 referred to above and the specification of which is incorporated herein, the synchronization system employs a magnetic tape having perforations along one edge thereof, the perforations in combination with an optical and electrical system serving to generate pulses to actuate the camera 10. While perforations are preferred other spaced indicia capable of being sensed electrically, magnetically, optically or tactilly can be used. With reference to FIG. 2, there is illustrated two posts 26, 27 mounted on one side of a perforated magnetic tape 30. These posts normally are found in a conventional tape recorder located adjacent to a recording head 32 to serve as guide posts for placing the cassette 22 in its proper position, the posts being received by apertures 23, 25 in the cassette. For the synchronization system of this invention, one of the posts 26 are hollowed out and is supplied with a miniature light bulb 28, one type being commerically identified as Tungsol TS-30. An aperture 34 extends transversely through the post 26 aligned with the perforations 36 through the tape 30.

A photocell 38 in the form of an integrated circuit which includes a pulse shaper and amplifier is mounted in alignment with the aperture 34 of the post 26 on the opposite side of the tape 30. This type of photocell is available commercially, such as the Centralab photocell C.R.L. No. OH102. By being aligned with the post aperture 34 the photocell 38 receives the light rays from the bulb 28 which pass through the tape perforations 36. The photocell 38 provides an electrical pulse each time a perforation 36 passes in alignment with the aperture 34 and photocell 38 and, consequently, the pulses from the photocell correspond with the movement of the magnetic tape 30.

CAMERA AND TAPE RECORDER CIRCUITS

Figure 3:
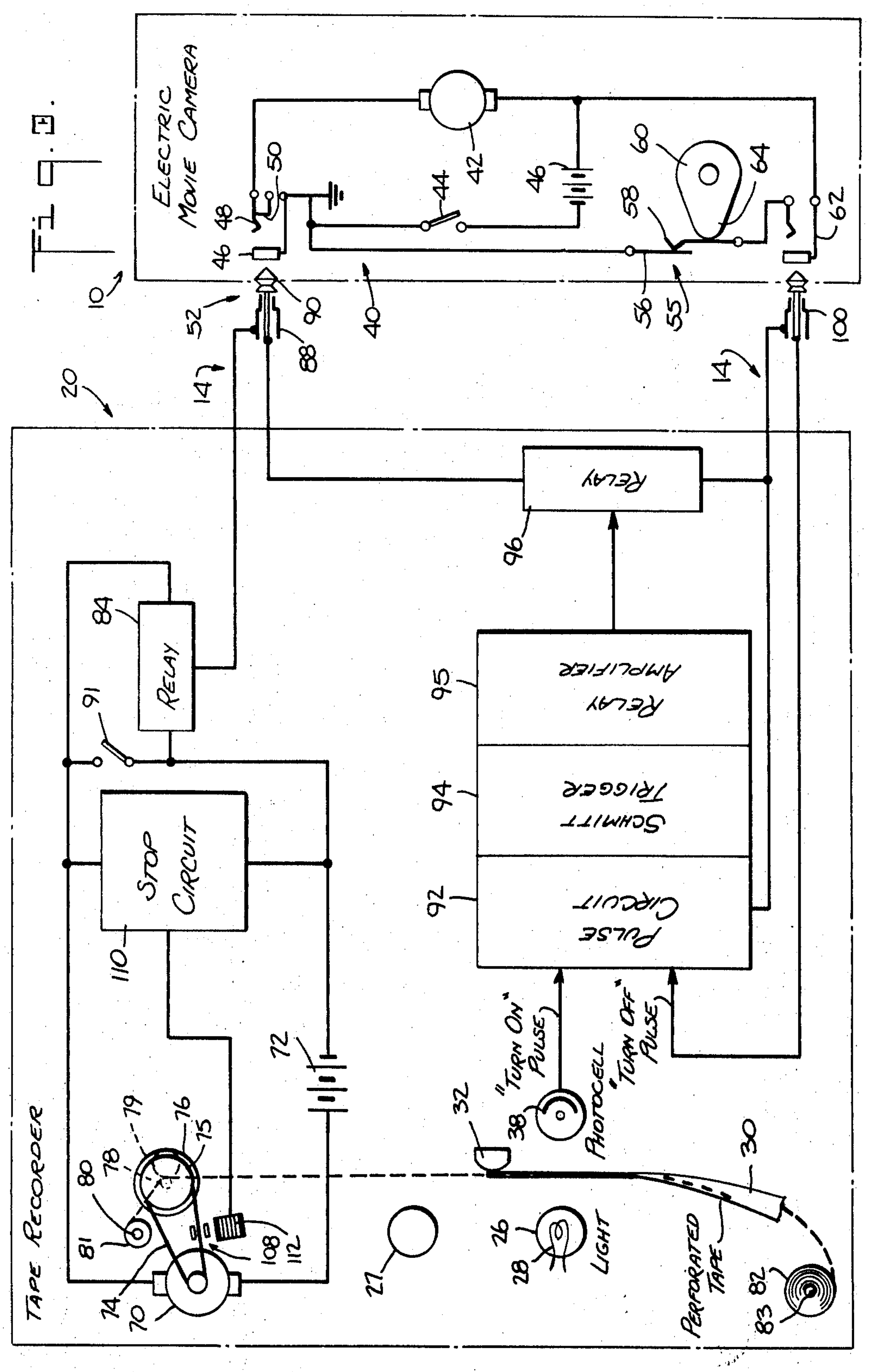
FIG. 3 is a block diagram illustrating the improved synchronization system of this invention.

Turning now to FIG. 3, a schematic diagram of the camera circuit 40 is shown. The camera 10 includes a battery 41, a motor 42 and a two position on-off switch 44 operated by the camera trigger 16. The circuit comprising the battery 41, motor 42 and switch 44 exists in standard electrically powered cameras. To adapt the standard camera so that it may be used with the synchronization system of this invention a terminal 12 is added which includes an annular contact 46, a spring loaded movable contact 48 and a stationary contact 50. When the contact 48 is in its normal position it is in electrical connection with the stationary contact 50 which in turn is connected to the switch 44. The contact 48 also is in electrical connection with the camera motor 42 so that closing the switch 44 completes a circuit through the motor 42 and battery 41. When the contact 48 is moved away from contact 50 by insertion of a plug contact 52 in the terminal 12, there is a break in the camera motor circuit 40 and closing the switch 44 will not energize the camera motor.

Many electrically operated cameras are provided with means for synchronizing a photoflash unit (not shown) with the camera shutter so that if desired each time the shutter opens an electrical signal is provided to the photoflash unit to generate a flash of light. Such a system is schematically illustrated in FIG. 3 as including a switch 55 comprises of a pair of normally spaced contacts 56, 58, a flash control cam 60 and a terminal 62 connected in series with the battery 41. The cam 60 is driven by the camera motor 42 and is designed so that the high point 64 of the cam closes the switch 55 at the end of a frame exposure and just prior to the next successive opening of the camera shutter. The cam 60 also serves to keep the camera motor operating so as not to terminate operating in the middle of a frame. The associated means for doing this is standard and not shown. The terminal 62 is adapted to receive a plug contact (not shown) from the photoflash unit so that each time the contacts 56, 58 are closed by the cam 60 an electrical signal is transmitted to the flash unit to actuate the flash in synchronization with the opening of the shutter. A camera which is not equipped with this system can be modified to include it easily and inexpensively.

The tape recorder 20 conventionally includes a motor 70 in series with a battery 72. The motor drives the magnetic tape 30 through conventional tape transport means including a pulley belt 74 and pulley 75 driving a flywheel 76 which in turn drives a capstan 78 at constant speed, the capstan being mounted on the flywheel shaft. The tape 30 which is located between the capstan and an idler wheel 79 is moved by the rotating capstan. The flywheel also effects rotation of take-up reel post 80 over which a cassette take-up reel 81 is placed, the take-up reel receiving the tape 30 from a supply reel 82 mounted over a post 83. The tape, in passing from the supply reel 82 to the take-up reel 81, passes by the cassette guide post 26, 27 and photocell 38.

The synchronization system of this invention requires the addition of the following circuitry to conventional tape recorder circuitry. A two position switch in the form of a standard reed relay 84 is placed in series with the motor 70 and battery 72. A recorder cable 14 has one end connected to the tape recorder 20 and the other end is provided with a plug contact 52 adapted to mate with the camera terminal 12. The plug contact 52 includes a conductive outer sleeve 88 adapted to electrically engage the annular contact 46 and a central post 90 adapted to electrically engage the movable contact 48. When the plug contact 52 is inserted in the terminal 12, the central post 90 causes the contact 48 to move away from the stationary contact 50 thereby breaking the circuit 40 involving the camera motor 42, battery 41 and camera on-off switch 44. In place of that circuit the battery 41 and camera switch 44 are placed in circuitry with the tape recorder 20 by means of the contact 52 and the relay 84. Depressing the camera trigger 16 closes the switch 44 putting the camera battery 41 in series with the reed relay 84 to effect closure of the relay. When the relay 84 is closed the tape recorder battery 72 energizes the tape recorder motor 70 which then drives the tape transport system. The battery 72 also energizes the light 28 in the post 26.

In order to permit the tape recorder 20 to be used as a conventional recorder independent from the camera 10 switch means 91 is provided which, when closed manually, places the battery 72 in circuit with the tape recorder motor 70 bypassing the camera controlled relay 84.

As the magnetic tape 30 moves by the lighted post 26 the photocell 38 receives light pulses through the perforations 36 in direct relation to the speed at which the magnetic tape 30 is moving and produces an electrical pulse or signal for each light pulse it receives. Each signal is amplified and squared by the amplifier which is part of the photocell integrated circuit. The signal then turns on a bistable trigger circuit 94, such as a Schmitt trigger, which provides a signal of predetermined amplitude independent of the magnitude of the light pulse. The trigger signal is amplified by an amplifier circuit 95 and is utilized to close a camera control reed relay 96. Closure of the relay 96 completes the camera circuit through the center post contact 90 of the plug contact 52 and movable contact 48 resulting in actuation of the camera motor 42.

A second recorder cable 14 having a plug contact 100 on one end is inserted within the photoflash terminal 62 in order to conduct the electrical pulse intended for the photoflash unit as described above to a pulse circuit 92 in order to turn off the bistable trigger circuit 94 after each motion picture film frame is exposed. With the bistable trigger in the "off" mode, the camera control relay 96 opens turning the camera off. In this fashion the photoflash pulse becomes a synchronization pulse. The pulse circuit ensures that the turn-off pulse is of the proper polarity to accomplish its purpose. As can be seen, the magnetic tape 30 passing between the post 26 and photocell 38 effects generation of an electrical pulse for each perforation 36 through the tape 30. The electrical pulse generated by virtue of movement of the magnetic tape 30 actuates the motion picture camera which causes the film to advance one frame at which time the camera motor circuit is opened by the relay 96 due to the fact that the trigger circuit has been turned off by the synchronization pulse. The camera motor circuit is closed again when the next successive magnetic tape perforation 36 passes between the post 26 and the photocell 38. In other words, the magnetic tape perforations in effect turn the camera on and the synchronization pulse turns the camera off at the end of each frame. It can be appreciated that each frame of the motion picture film corresponds to the portion of the magnetic tape between adjacent perforations. The perforations on the film and tape permit direct mechanical and visual synchronization of the sound recording tape and visual image recording film.

If the tape recorder speed varies even slightly as a result of load, atmospheric conditions, battery conditions, etc., synchronization will remain because the camera is slave controlled by movement of the magnetic tape 30. Furthermore, the camera 10 will not operate and film will not be exposed if the tape recorder 20 is not operating properly. For example, if the light bulb 28 is not on or if the cassette 22 is placed upside down in the recorder 20 so that the perforations are not aligned with the photocell 38 no light will be transmitted to the photocell to generate a camera "turn-on" signal. Similarly, when the magnetic tape 30 is used up no additional light pulse will be received by the photocell 38 and, consequently, the camera will not continue to operate. Because the photocell is very sensitive and because the signal from the photocell 38 is squared and amplified to the desired level, a proper signal will be received by the trigger circuit 94 even though the light source 28 providing the light signal varies in intensity. Consequently lip synchronization will be maintained over the usable life of the tape recorder battery. By using the relays 84, 96 in the tape recorder 20 and by having the turn-on signal powered by the tape recorder battery 72 and not dependent upon the camera battery 46 the tape recorder power circuit is electrically isolated from the movie camera power circuit. This adds flexibility of use to the synchronization circuit because the tape recorder 20 can be used with various cameras having wide power requirements without having to control or modify the current available in the camera motor circuit to make it compatible with the tape recorder circuit.

MAGNETIC TAPE BRAKE (FIGS. 3 – 6)

Figure 4:
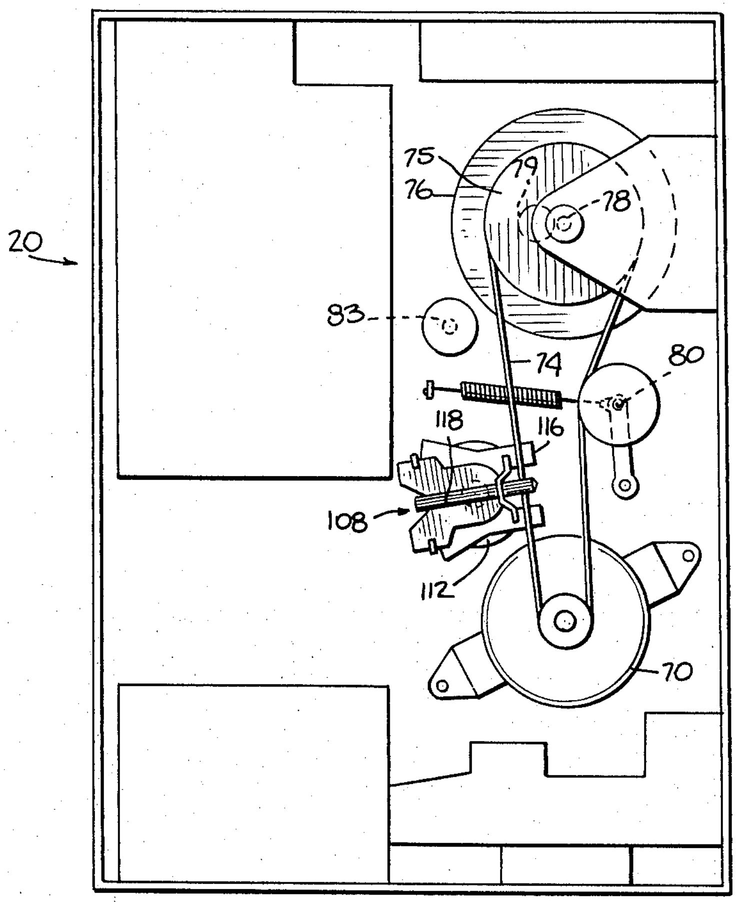
FIG. 4 is a plan view of a portion of a cassette type tape recorder having a magnetic tape brake formed in accordance with a first embodiment of this invention.

In order to maintain lip synchronization, it is necessary to effectively stop movement of the perforated magnetic tape 30 immediately upon release of the camera trigger 16. When conventional tape recorders are turned off the tape continues to advance a short distance due to the inertia of the flywheel 76 which drives the capstan 78. This movement cannot be tolerated if synchronization is to be maintained. FIGS. 3, 4 and 5 illustrate one form of mechanical brake 108 which effectively instantaneously stops movement of the capstan 78 and thereby terminates movement of the tape 30 upon release of the camera trigger 16.

A stop circuit 110 is included within the tape recorder 20 and is mounted in parallel with the relay 84 and in series with the tape recorder battery 72 and motor 70. The stop circuit 110, which is illustrated in detail in FIG. 7 and described below includes a capacitive-resistive circuit which controls the operation of the brake 108. When the camera trigger 16 is released opening the camera motor switch 44 and deenergizing the relay 84, the stop circuit 110 energizes an electromagnet 112 which operates the brake 108 and stops further movement of the magnetic tape 30.

FIGS. 4 and 5 show the brake in detail. The belt 74 which drives the flywheel 76 passes over a pulley guide support 116 which is mounted between the brake control electromagnet 112 and a magnet leaf spring brake arm 118. When the electromagnet 112 is energized by the stop circuit 110 the brake arm 118 is instantly drawn toward the magnet 112 and mechanically grabs the belt 74 preventing further movement of the pulley 75 and, consequently, of the flywheel 76, capstan 78 and magnetic tape 30. Upon completion of the operation of the stop circuit 110 the magnet 112 becomes deenergized and the resiliency of the leaf spring brake arm 118 causes the arm to move away from the magnet 112 freeing the belt 74. By virtue of this inexpensive, positive brake mechanism the magnetic tape 30 is stopped in its movement virtually simultaneously with release of the movie camera switch trigger 16 preserving the synchronization between the magnetic tape 30 and the movie film. Furthermore, the brake mechanism makes minimal demands upon the tape recorder battery 72 and draws no power during operation of the recorder. Since it draws no power during operation of the tape recorder, the brake does not constitute a drain on the battery.

Figure 6:
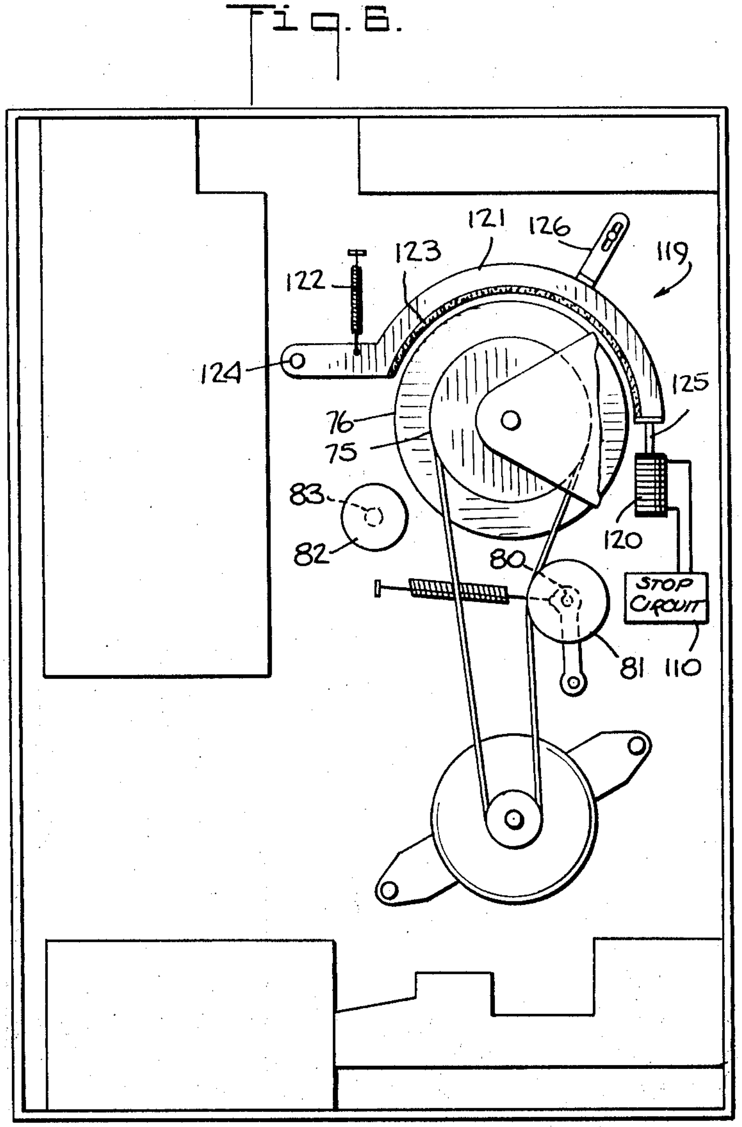
FIG. 6 is a plan view of a portion of a cassette type tape recorder having a magnetic tape brake formed in accordance with a preferred embodiment of this invention.

FIG. 6 illustrates a second form of mechanical brake which is a preferred brake mechanism 119. The brake mechanism 119 comprises a solenoid 120, a brake shoe 121 and a return spring 122. The brake shoe 121, which is of molded plastic and lined on the inner surface with a conventional brake material 123, such as rubber impregnated canvas, is contoured to the shape of a substantial portion of the periphery of the flywheel 76 and is pivotally mounted at one end to the tape recorder housing by a pivot pin 124. The other end of the brake shoe is provided with an iron rod or plunger 125 which is located partially within the solenoid 120 and the solenoid is connected to the same stop circuit 110 which was partially described above and which is described in greater detail below in connection with FIG. 7. The return spring 122 opposes the force of the solenoid and returns the brake shoe to its normal position spaced slightly from the flywheel 76, in the order of 0.0625 inches. The return position is established by an adjustable stop 126. The return spring 122 is located near the pivot pin 124 and away from the solenoid 120 to provide the solenoid with a greater moment arm in countering the spring force and, therefore, helps minimize the force required of solenoid.

When the camera trigger 16 is released opening the camera motor switch 44 and relay 84 the stop circuit 110 immediately energizes the solenoid 120 which draws the brake shoe 121 against the flywheel 76 stopping rotation of the capstan 78.

The stop circuit allows the solenoid to draw current only when the tape recorder is turned off and even then only long enough to stop movement of the capstan. Therefore, the solenoid places a minimal burden on the tape recorder battery 72.

DETAILED CIRCUIT DIAGRAM OF PREFERRED EMBODIMENT

Figure 7:
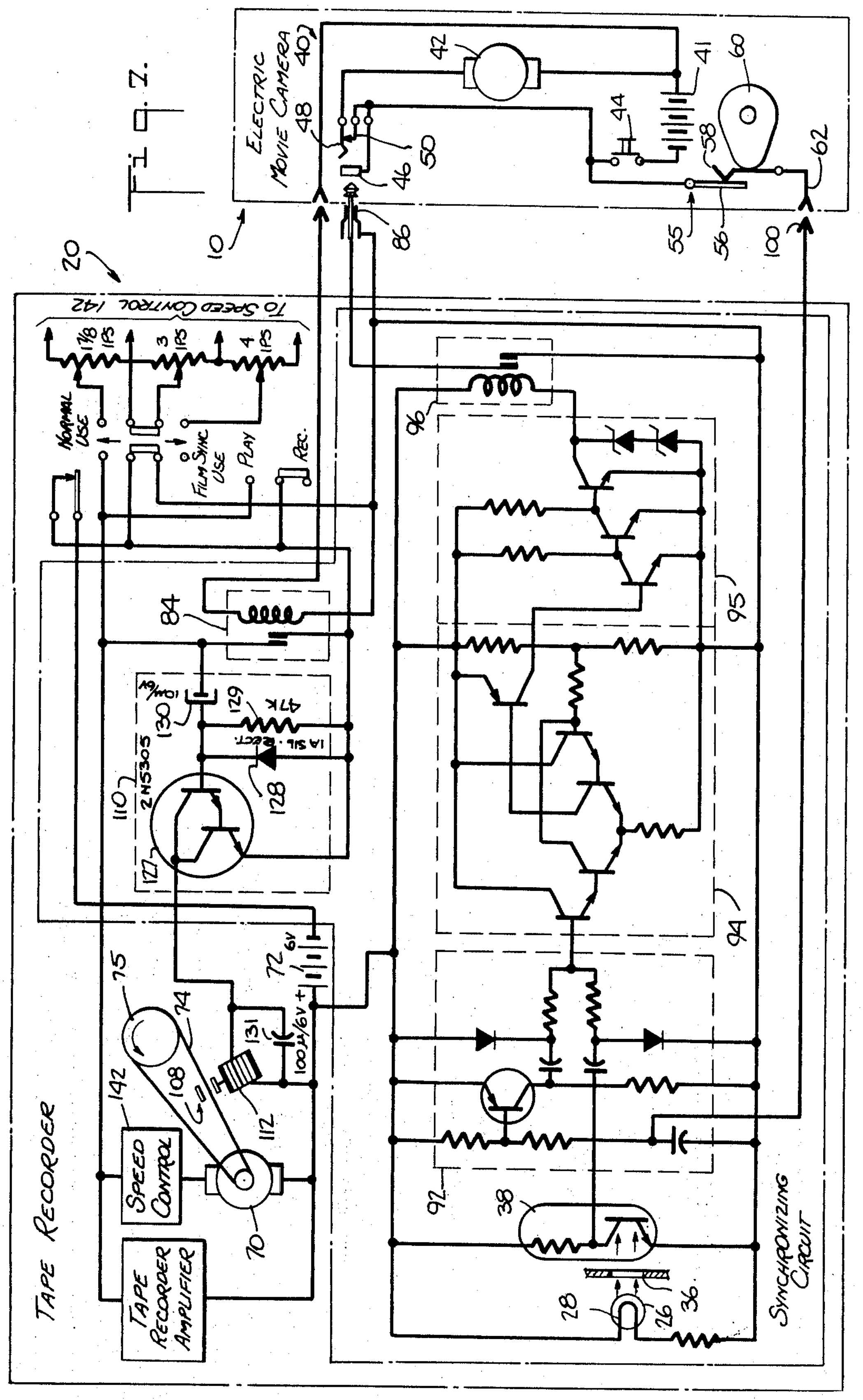
FIG. 7 is a detailed circuit diagram illustrating one embodiment employing the synchronization system of this invention.

FIG. 7 is the circuit diagram illustrating in detail the circuits shown in block schematic form in FIG. 3 and described above. Corresponding circuits outlined by dashed lines are identified by the same indicia used in FIG. 3. As can be seen, the circuit of the tape recorder 20 includes a relay 84 which is controlled by the camera switch 44 and battery 41. When the relay 84 is closed the tape recorder motor 70 is energized with current from the battery 72.

The light 27 in post 26 passing through a perforation 36 in magnetic tape 30 illuminated the photocell integrated circuit 38 to provide a "turn on" pulse which pulse is shaped (squared) and amplified by the photocell integrated circuit 38. In this circuit 38 the pulse is amplified to a level which insures activation of the bistable switch formed by the Schmitt trigger circuit 94. When the Schmitt trigger is activated its signal, which is of a predetermined amplitude not necessarily proportional to that of the turn-on pulse from the photocell, is further amplified by the relay amplifier 95 in order to provide a current sufficiently large to close the camera motor relay 96 and energize the camera motor 42 with current from the battery 41. While a Schmitt trigger 94 is employed in the embodiment illustrated, other quick acting bistable triggers of conventional design could be utilized.

After the camera motor advances and exposes on complete frame of the motion picture film the synchronization pulse from the switch 55 is fed to the pulse circuit 92 which ensures that a "turn-off" pulse of proper polarity is directed to the bistable trigger circuit 94 in order to open the camera motor relay 96 and stop the camera motor 42. The relay 96 remains open until the next tape perforation 36 permits light to illuminate the photocell providing a "turn-on" pulse.

Figure 8:
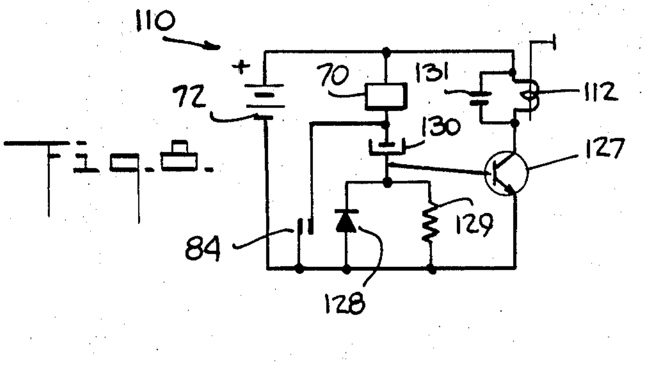
FIG. 8 is a circuit diagram of the brake stop circuit which forms a part of the circuit diagram of FIG. 7.

FIGS. 7 and 8 illustrate in detail the stop circuit 110 for activating the brake electromagnet 112 or solenoid 120. The stop circuit 110 includes an electronic valve such as a transistor 127 of the type known as a Darlington transistor, a silicon rectifier 128, a resistor 129 and a capacitor 130.

The resistor 129 and capacitor 130 are connected in series with the battery 72 and the side of the capacitor which is connected two the negative side of the battery also is connected to control element, or base, of the transistor 127. The rectifier 128 is across the resistor 129.

When the recorder 20 is used in conjunction with the camera 10 and the camera switch 44 is closed the relay 84 is closed and the tape recorder 70 is energized. During operation of the tape recorder the normally closed relay 84 shorts out the resistor 129 and capacitor 130 and biases the transistor 127 off rendering the transistor normally open. Consequently, while the tape recorder is operating the transistor 127 and electromagnet 112 (or solenoid 120) draw no current. The instant the camera switch 44 and relay 84 open, the capacitor 130 charges through the resistor 129. During the initial charging period the voltage at the juncture of the resistor 129 and capacitor 130 is sufficient (at least 0.7 – 1.0 volts) to turn on the transistor 127 and energize the electromagnet 112 (or solenoid 120). The transistor remains on until the charge on the capacitor 130 rises to the level where the current through the resistor 129 is too low to provide the necessary voltage to maintain the transistor on. At that time the transistor "opens" and the capacitor 130 retains its charge preventing the transistor from closing because when the capacitor is charged no current flows through the resistor 129 and there is no voltage drop across the resistor. Therefore, there is no voltage applied to the transistor base. It can be seen that the resistive-capacitive circuit 129, 130 turns on the transistor 127 for a predetermined period of time set by the r-c (129–130) time constant and then turns the transistor off. The time that the transistor is on is sufficient to terminate rotation of the flywheel 76 and capstan 78.

In order to reset the stop circuit 110 for subsequent activation of the brake it is necessary to discharge the capacitor 130. This is accomplished when the relay 84 is closed to turn on the tape recorder. To reduce the capacitor discharge time a rectifier 128 is used so that the capacitor discharges essentially instanteously through the rectifier upon closing the relay 84.

A second capacitor 131 is placed across the electromagnet 112 (or solenoid 120) in order to increase the rate of current through the coils and the braking action when the transistor 127 turns on. Because of the high inductive reactance of the electromagnet (or solenoid) its actuation tends to be relatively slow; however, the capacitor 131 reduces the circuit's reactive impedance to substantially increase its speed of activation. The capacitor 131 increases the response of the magnet and also delays the complete termination of energy supplied to the electromagnet when the transistor is turned off.

In addition to the features and circuitry illustrated and described above with reference to FIG. 3, the circuit illustrated in FIG. 7 also includes other features which increase the flexibility of use of the tape recorder 20. The recorder 20 includes a three position speed selector switch 140 connected to an electronic conventional motor speed control 142 enabling manual selection of the conventional tape recorder speed of 1 ⅞ inches per second (ips) for normal (non-movie synchronization) use, for film synchronization use at 3 inches per second when simultaneously recording sound in connection with the taking of movies at the rate of 18 frames per second or 4 inches per second when the camera speed is 24 frames per second. The speeds of 3 ips and 4 ips are selected in order that the distance between each pair of perforations in the magnetic tape corresponds to a frame of the motion picture film and also so that each inch of magnetic tape 30 corresponds to an inch of movie film. If desired the motor speed control 142 can operate the tape recorder motor 70 at other speeds if the camera is designed to operate at different speeds. The speed selector switch 140 and its associated circuitry is designed so that when the tape recorder is used in the non-synchronization mode, i.e., at a speed of 1 ⅞ ips, the light 27 in post 26 is not energized thereby precluding operation of the camera together with the tape recorder at an improper speed. The light is energized only at the speeds intended for use in combination with the camera thereby conserving the battery 72 and light bulb 27 when the recorder 20 is used as a conventional recorder and not in combination with the camera. The non-synchronization mode on the selector switch 140 also serves the purpose of the switch means 91 illustrated in FIG. 3.

By establishing an inch-for-inch correspondence between the magnetic tape 30 and movie film editing of the magnetic tape and movie film without losing lip synchronizatoin is simplified. Once corresponding points on the tape and film are established and marked the two recording mediums can be mechanically aligned. This also simplifies accurately transcribing the recorded sound on the film stripe (edge) if such is desired. The perforations through the tape when used with a sprocket on a playback tape deck prevent slippage and a concomittant loss of synchronization.

What is claimed is:

1. For use in a battery operated tape recorder having a control switch, a brake system comprising an electrically activated brake, means for placing said brake in an off state when said control switch is in a closed position wherein the tape recorder is operating, means for instantaneously placing said brake in an on state until the occurrence of a predetermined event preventing movement of the tape when said control switch is in an open position wherein the tape recorder is not operating and means for placing said brake in an off state upon the occurrence of said predetermined event.

2. The brake system of claim 1 wherein said predetermined event is a period of time.

3. The brake system of claim 2 including capacitive means, the capacitive means being charged by the battery immediately upon opening the control switch and wherein the brake is responsive to the charging of said capacitive means when the control switch is in said open position.

4. The brake system of claim 3 wherein the brake is placed in the on state during charging of said capacitive means and is placed in the off state when said capacitive means is charged beyond a predetermined level.

5. For use in a tape recorder having series connected motor driven tape transport means and a battery, a brake system comprising an electrically activated brake, a normally open electronic valve having a control element, the brake and valve being in series with the battery, capacitive means and resistive means coupled in series with the battery, means coupling the voltage at the juncture of the capacitive and resistive means with the control element, and a control switch across the capacitive means being closed when the motor is energized, the valve being open and preventing energization of the brake when the control switch is closed, the battery charging the capacitive means through the resistive means to effect the junction voltage when the control switch is open, the valve being closed when the juncture voltage is a first amount and opened when the juncture voltage is a second amount.

6. The brake system of claim 5 including second capacitive means across the brake.

7. The brake system of claim 5 wherein the brake includes an electromagnet.

8. The brake system of claim 7 including rectifying means across the resistive means through which the capacitive means discharges upon closing the control switch.

9. The brake system of claim 5 wherein the brake includes a solenoid and a plunger substantially within the solenoid.

10. The brake system of claim 9 including a brake shoe drivingly connected to the plunger and adapted to frictionally engage the tape flywheel and wherein the brake shoe is pivotally mounted and including resilient means energization of the solenoid.

11. The brake system of claim 9 wherein the tape transport means includes a flywheel drivingly connected to a motor and a capstan drivingly connected to the flywheel and including a brake shoe drivingly connected to the plunger and adapted to frictionally engage the flywheel upon energization of the solenoid.

12. The brake system of claim 11 wherein the configuration of the brake shoe conforms to at least a portion of the including resilient means biasing the brake shoe away from the flywheel.

13. The brake system of claim 12 including a stop spaced from the flywheel for limiting movement of the brake shoe away from the flywheel and wherein the pivoted mounting is spaced from the point of connection of the brake shoe to the plunger, the resilient means being located adjacent to the pivotal mounting.

* * * * *